(12) United States Patent
Park

(10) Patent No.: US 6,260,141 B1
(45) Date of Patent: Jul. 10, 2001

(54) SOFTWARE LICENSE CONTROL SYSTEM BASED ON INDEPENDENT SOFTWARE REGISTRATION SERVER

(76) Inventor: Hyo Joon Park, Kwacheon Jugong Apt. 408-504, 7, Byalyang-dong, Kwacheon-si Kyungki-do 427-040 (KR)

( * ) Notice: Subject to any disclaimer, the term of this patent is extended or adjusted under 35 U.S.C. 154(b) by 0 days.

(21) Appl. No.: 09/516,789

(22) Filed: Mar. 1, 2000

Related U.S. Application Data

(63) Continuation of application No. PCT/KR97/00175, filed on Sep. 19, 1997.

(51) Int. Cl.[7] ........................................................ G06F 1/24
(52) U.S. Cl. ............................................ 713/155; 713/169
(58) Field of Search ..................................... 713/155, 169, 713/171, 176, 182; 380/255, 277, 278, 283

(56) References Cited

U.S. PATENT DOCUMENTS

| | | |
|---|---|---|
| 5,490,216 | 2/1996 | Richardson, III . |
| 5,553,143 | 9/1996 | Ross et al. . |
| 5,568,552 | 10/1996 | Davis . |

OTHER PUBLICATIONS

Bruce Schneier "Applied Cryptography", John Wiley & Sons, Inc., Second Edition, 1996, pp. 584–587.
Simson Garfinkel "PGP: Pretty Good Privacy", O'Reilly and Associates, Jan., 1995, entire book.

*Primary Examiner*—Thomas R. Peeso
(74) *Attorney, Agent, or Firm*—Jones Volentine, PLLC

(57) ABSTRACT

A software license control system is based on independent software registration servers. The registration servers are open to all software manufacturers. On user's computer, a software product asks the user software license control program whether the user has a usage license for the software product. The user license control program checks the license file, received from a software registration server, and answers the software product. If the answer is "no", the software product stops running. If the answer is 'yes', the software product continues. The license file cannot be used by unauthorized user because the file is encrypted by the user public key and digitally signed by the secret key of a software registration server. To use a license file, user needs the secret key of the user and needs a passphrase to activate the secret key. The license file is digitally signed by the software registration server and cannot be modified by a user to add unauthorized licenses. There are three types of registration need to be done by user: user registration, hardware registration and software product usage license registration. A user does user registration once per person. After that, the user registers the computer hardware once per computer hardware. The user registers software product usage license once per every product of specific hardware. The license file is updated every time the user registers a new software product.

20 Claims, 1 Drawing Sheet

SOFTWARE LICENSE CONTROL SYSTEM BASED ON INDEPENDENT SOFTWARE REGISTRATION SERVER

CROSS-REFERENCE TO RELATED APPLICATIONS

The present application claims priority under 35 U.S.C. §120 to PCT Application No. PCT/KR97/00175 filed on Sep. 19, 1997, the entire contents of which are hereby incorporated by reference in its entirety for all purposes.

BACKGROUND OF THE INVENTION

1. Field of the Invention

The present invention is directed to systems for software registration, more specifically, systems which use software registration servers and require registration of each user and component hardware only once.

2. Description of Related Art

Early licensing schemes involved hardware specific licenses which allow software only to run on a specific machine. As personal computers have become the norm, current licensing schemes are typically user specific licenses, which allow a predetermined number of users to operate the software at a particular time. Typically, these user specific licenses are still limited to certain hardware. Many current software registration systems require a separate license number for each user/hardware combination. Further, most software registration systems are specific for each software manufacturer, requiring multiple identifications of a user and/or hardware. However, the same registration procedure cannot be used for all of the available licensing arrangements and all software product manufacturers.

SUMMARY OF THE INVENTION

The present invention is therefore directed to software registration systems which substantially overcomes one or more of the problems due to the limitations and disadvantages of the related art.

It is an object of the present invention to provide a flexible, universal, secure software registration system.

At least one of the above and other objects may be realized by providing a method of software license control based on independent software registration servers including creating a secret/public key pair for a user, connecting to a software registration server, sending the user's public key to the software registration server and receiving the public key of the software registration server, registering a user once per person to the software registration server and receiving partial user-ID file that includes user information encrypted by the user public key and digitally signed by software registration server, attaching the user secret/public key pair and the public key of the user's software registration server to the partial user-ID file, registering a user's computer hardware once for each computer hardware to said software registration server and receiving a license file that includes computer hardware information encrypted by user public key and digitally signed by software registration server secret key, and registering a software product to said software registration server and receiving an updated license file which now includes the registered software product information in addition to the computer hardware information.

The method may further include distributing software product included in the license file. The method may include validating software product usage license including asking the user software license control program on user computer hardware whether the user has usage license for the software product for the specific computer hardware, and stopping the software product from running if the answer is "no". The software product usage license may be given to a specific computer hardware of a specific user, to a specific user for any computer hardware, or to a specific computer hardware for any user.

The method may include storing user information, CPU information and software product usage license information in a software registration server database. The method may include replicating the software registration server database to a central software registration server database for backup purpose and for cross software registration server function.

The method may include registering, by software product manufacturers, software product information for software products to a central software registration server. The registered software product information may include at least one of product ID, price, and prerequisite software. The method may include distributing the software product information from the central software registration server to all software registration servers. The method may further include selecting, by a user, a software product from the registered software product list.

The method may include connecting software registration server before having a license file for an operating system and a network program. The method may include providing a limited license file for the operating system and network program.

There may be a plurality of software registration servers and the connecting may include selecting a software registration server from said plurality of software registration servers. Alternatively, the central software registration server may be the only software registration server and is used during the connecting The creating may be performed by the user's computer hardware or by the software registration server.

At least one of the above and other object may be realized by providing a software license control system including a central software registration server receiving software product information from any software manufacturer, a software registration server receiving the software product information from the central software registration server, and a connection between a user and said software registration system which provides the software registration server with user registration, hardware registration, and software registration, the software registration creating a license file based on these registrations.

The software registration server may include a plurality of software registration servers, all receiving the software product information from the central software registration server, and the connection selecting a software registration server from the plurality of software registration servers.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF PREFERRED EMBODIMENTS

The registration server in accordance in the present invention is independent of software product manufacturers and open to all software manufacturers. Once registration is complete, attempted usage of a software product will result in the software product asking the user's software license control program on a user's computer whether the user has a usage license for the software product. The user's license control program checks the license file, received from a software registration server, and answers the software product. If the answer is "no", the software product stops running. If the answer is 'yes', the software product continues. The license file cannot be used by unauthorized user because the file is encrypted by the user's public key and digitally signed by the secret key of the software registration server. To use a license file, the user needs the secret key of the user and needs a password to activate the secret key. The license file is digitally signed by software registration server and cannot be modified by a user to add unauthorized license.

Figure 1:
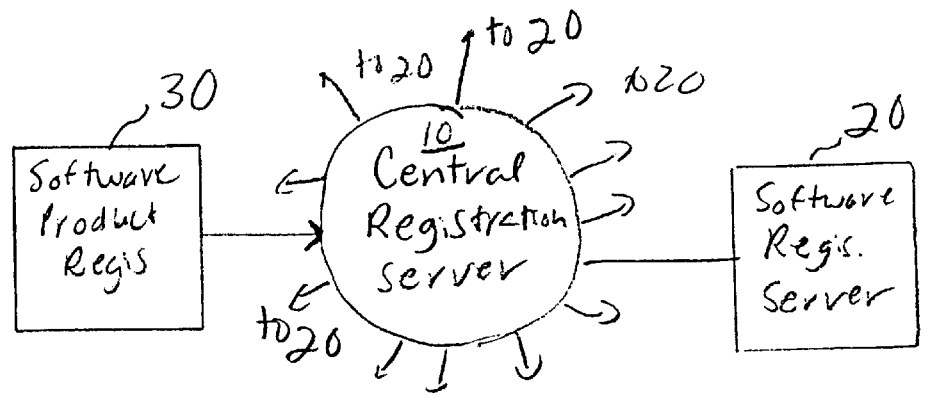
FIG. 1 is a schematic view of the central registration server connected to the software product registration and the software registration servers in accordance with the present invention.
Figure 2:
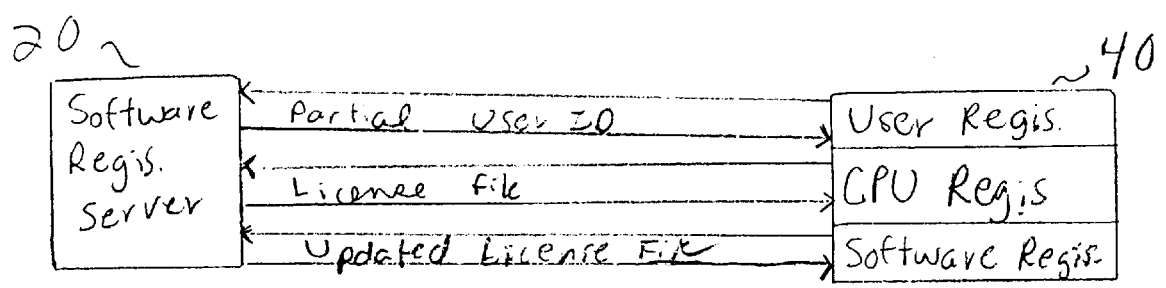
FIG. 2 is a schematic view of a software registration server connected to a user in accordance with the present invention

As shown in FIG. 1, all software product manufacturers may register their software products to a central software registration server 10 via an input 30. The central registration server 10 distributes the registered product information to software registration servers 20 all over the world. As shown in FIG. 2, there are three types of registration that need to be performed by the user, i.e., user registration, hardware or central processing unit (CPU) registration and software product usage license registration, via a connection 40 to a software registration server 20. The user performs user registration for himself once per person. After that, the user registers his CPU once per CPU. Finally, the user registers software product usage license once per every product of specific CPU. All the registration is done after the connection 40 to a software registration server has been established.

When the user begins registration, the user gets a partial user-ID file from the software registration server. After receiving the partial user-ID file, the user's software license control program attaches a public/secret key pair of the user and the public key of the registration server of the user to the partial user-ID file. This user-ID file is essential in registering a CPU and purchasing software products. The user-ID file is independent of any CPU and this file need to be copied to all CPUs to be used by the user. When a CPU is registered, the user gets a license file from the software registration server. The license file is updated every time the user purchases a new software product or upgrades a software product. The software product information is added to the license file every time a new product is purchased or a product is upgraded. Also, because of expiration date, the license file is refreshed periodically. Expiration date or refresh period prevents unauthorized longterm use of the user-ID file or license file. A software product usage license is given to a specific CPU of a specific user. To purchase a software product, the user may select a product category, and then the user's license control program displays all relevant software products in that product category and user selects the software product. Then, the user's license control program sends software product purchase request to the software registration server. The license file is dependent on a specific CPU. The license file is given to a specific CPU of a specific user. Both the user-ID file and license file are encrypted by the user's public key and digitally signed by software registration server secret key. So, only the software registration server can modify these files.

In addition to above licensing arrangement, called a user/CPU based license, there are two more licensing arrangements which may be used in accordance with the present invention. One arrangement is a user-based license. The user-based license is given to a specific user without having any CPU restriction on its license file. The user-based license can be used on any CPU and is strongly controlled by the user. The other arrangement is a CPU-based license. The CPU-based license is given to a specific CPU without having any user restriction on its license file.

Normally, the license file is encrypted by user public key, but a CPU based license file is encrypted by the CPU public key. For a CPU-based license, one pair of secret/public key is created just for the CPU. In case of a user/CPU based license and user based license, the pair of secret/public key of the user is used without creating new key pair for the CPU. When the software is used by a company, there is an owner in addition to a user of a PC/workstation. This owner has the right to change the user of a PC/workstation. If an employee quits the company, the company (owner) can assign a new user to the PC/workstation. There is owner information in addition to user information in license file.

Thus, in accordance with the present invention, software license control may be realized using an independent software registration server including creating secret/public key pair for a user by the user software license control program on the user computer. The key pair for a user can be created optionally by the registration server on the registration server site. The user can be connected to the software registration server by selecting a software registration server from a list of software registration servers, sending the user's public key to the software registration server and receiving the public key of the software registration server. The software registration server is open to all software product manufacturers and is not just for one software manufacturer.

The user is registered to the software registration server once per person and receives a partial user-ID file from the software registration server. The user software license control program attaches the user secret/public key pair and the public key of the user's software registration server to the partial user-ID file that includes user information encrypted by user public key and is digitally signed by the server secret key. This user-ID file is essential in registering CPU and in registering software product usage license.

The CPU is registered to the software registration server and receives a license file that includes CPU information encrypted by the user public key and is digitally signed by software registration server secret key.

Upon purchasing a software product, the software product is registered to the software registration server. The user receives an updated license file which now includes the purchased software product information in addition to CPU information. This new license file replaces the old license file.

In order to distribute the software product, the software product is digitally signed by the software registration servers, the central software registration server or the software product manufacturer. The digitally signed software product can be downloaded from the software product manufacturer, any software registration server or any file transfer protocol (FTP) site.

In order to validate the software product usage license, the software product asks the user's software license control program on the user's computer whether the user has a usage license for the software product of the specific CPU. The user software license control program checks the license file and answers the sof"no",tware product. If the answer is no, the product stops running. The software product usage license is given to a specific CPU of a specific user.

User information, CPU information and software product usage license information are stored in a database on the software registration server database. The software registration server database may be replicated to a database in the central software registration server for backup purposes and for cross software registration server function, such as the change of software registration server and change of user who is registered to a different software registration server than the former user.

The software products are registered to the central software registration server by software product manufacturers. Registered software product information includes product ID, price, prerequisite software, etc. The central software registration server distributes the product information to all software registration servers in the world. A user can select software product from the registered software product list. If user knows the product ID, he can select a software productjustby entering product ID without reviewing the list. Further, the user-ID file and license file are not static, but may be updated based on an expiration date or a refresh period. Such updating prevents unauthorized long-term use of the user-ID file or license file. Further, these files may changed by the owner of the CPU rather than a user if the owner information is also provided in the license file.

The user may be connected to a software registration server before having a license file for an operating system and a network program. Such an operating system and network program, which don't require checking the usage license for performance of a base function, such as merely connecting to a software registration server and registering software product usage licenses, removes the difficulty of obtaining usage license for operating systems and network programs, which would be required before their own registration has been completed. Instead of using a special operating system and network program, the user software license control program can give a limited license file to the operating system and network system, which allow them to be used within a test period.

Thus, the software license control system of the present invention works based on following servers and software packages:

Central software registration server gets software product information from all software product manufacturers and distributes the registered product information to software registration servers all over the world. The central registration serverdoes the interfacebetween all software product manufacturers and software registration centers.

Normal software registration servers give user the software product information that is given by the central software registration server, get registration request from users and give license file to users.

Software packages for general users, normal software registration servers, central software registration server and software product manufacturers.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method of software license control based on independent software registration servers comprising:

creating a secret public key pair for a user;

connecting to a software registration server, sending the user public key to the software registration server and receiving a public key of the software registration server;

registering a user once per person to the software registration server and receiving a partial user-ID file that includes user information encrypted by the user public key and digitally signed by the software registration server;

attaching the user secret/public key pair and the public key of the software registration server to the partial user-ID file;

registering a user computer hardware once for each computer hardware to the software registration server and receiving a license file that includes computer hardware information encrypted by the user public key and digitally signed by a secret key of the software registration server; and registering a software product to the software registration server and receiving an updated license file which includes information of the registered software product in addition to the computer hardware information.

2. The method of claim 1, further comprising distributing the software product.

3. The method of claim 1, further comprising validating a usage license of the software product by asking a user software license control program on the user computer hardware whether the user has the usage license for the software product for a specific computer hardware, and stopping the software product from running if the user does not have the usage license.

4. The method of claim 3, wherein the usage license of the software product is given to the specific computer hardware of the user.

5. The method of claim 3, wherein the usage license of the software product is given to the user for any computer hardware.

6. The method of claim 3, wherein the usage license of the software product is given to the specific computer hardware for any user.

7. The method of claim 1, further comprising storing user information, CPU information and software product usage license information in a software registration server database.

8. The method of claim 7, further comprising replicating the software registration server database to a central software registration server database for backup and for cross software registration server functions.

9. The method of claim 1, further comprising registering, by software product manufacturers, software product information for software products to a central software registration server.

10. The method of claim 9, wherein the registered software product information includes at least one of product ID, price, and prerequisite software.

11. The method of claim 9, further comprising distributing the software product information from the central software registration server to all software registration servers.

12. The method of claim 10, further comprising selecting, by a user, a software product from the registered software product information.

13. The method of claim 1, further comprising connecting the software registration server before having a license file for an operating system and a network program.

14. The method of claim 13, further comprising providing a limited license file for the operating system and the network program.

15. The method according to claim 9, wherein the central software registration server is the only software registration server and is used during said connecting.

16. The method according to claim 1, wherein there are a plurality of software registration servers and said connecting includes selecting a software registration server from said plurality of software registration servers.

17. The method according to claim 1, wherein said creating is performed by the user computer hardware.

18. The method according to claim 1, wherein said creating is performed by the software registration server.

19. A software license control system comprising:

a central software registration server receiving software product information from any software manufacturer;

a software registration server receiving the software product information from said central software registration server; and a connection between a user and said software registration server, which provides said software registration server with user registration, hardware registration, and software registration, the software registration creating a license file based on the registrations.

20. The software license control system of claim 19, wherein said software registration server includes a plurality of software registration servers, all receiving the software product information from said central software registration server, and said connection selecting a software registration server from said plurality of software registration servers.

* * * * *